United States Patent [19]

Owens et al.

[11] Patent Number: 6,043,314
[45] Date of Patent: Mar. 28, 2000

[54] PROCESS OF IMPROVING THE APPEARANCE OF A FLOOR POLISH COMPOSITION

[75] Inventors: Joseph Michael Owens, North Wales; Theodore Tysak, Ambler, both of Pa.

[73] Assignee: Rohm and Haas Company, Philadelphia, Pa.

[21] Appl. No.: 09/263,896

[22] Filed: Mar. 5, 1999

Related U.S. Application Data

[60] Provisional application No. 60/078,315, Mar. 17, 1998.

[51] Int. Cl.$^7$ ........................................ C08L 67/00
[52] U.S. Cl. ............................................... 524/599
[58] Field of Search ................................. 524/599

[56] References Cited

U.S. PATENT DOCUMENTS 3,855,170  12/1974  Junkin et al. .
4,017,662   4/1977  Gehman et al. .
4,460,734   7/1984  Owens et al. .

*Primary Examiner*—Kriellion Sanders

[57] ABSTRACT

The appearance of a floor polish composition can be improved by use of a divalent copper ion crosslinking agent in an amount of from 50 to 5000 ppm based on polymer solids in said composition.

3 Claims, No Drawings

6,043,314

PROCESS OF IMPROVING THE APPEARANCE OF A FLOOR POLISH COMPOSITION

This application claims benefit of Provisional Appln. 60/078,315 filed Mar. 17, 1998.

This invention is concerned with a process of improving the appearance of a floor polish composition and to a floor polish composition having improved appearance. More particularly, though not exclusively, this invention is concerned with the preparation of a floor polish vehicle composition comprising a water insoluble emulsion copolymer containing acid functional residues and at least on polyvalent metal ion or complex crosslinking agent.

Ironically crosslinked floor polish vehicle compositions are well known in the prior art. A floor polish vehicle composition is defined to include an aqueous suspension or dispersion of a water insoluble, film-forming polymer and water soluble or dispersible metal salts and complexes. Floor polish compositions are defined to comprise floor polish vehicle compositions together with one or more other useful floor polish ingredients such as alkali soluble resins, plasticizers, waxes, preservatives, dispersing agents, coalescents, leveling agents and optical brighteners.

Optical brighteners are added to floor polish compositions to improve the appearance or cleanliness of the polish once it has been applied on a floor. Examples of optical brighteners are disclosed in EP-A-0696625 and U.S. Pat. No. 4,371,398, and include distyrylbiphenyl- and stilbene-derivatives, sold by Ciba-Geigy under the TINOPAL trade name; and 2,2'-(2,5-thiophenediyl)bis[5-tert-butylbenzoxazole], available from Ciba-Geigy as UVITEX OB. Also, it is suggested in U.S. Pat. No. 4,371,398 that coumarin derivatives such as 4-methyl-7-diethylamine coumarin may be used as an optical brightener in a polish composition, but no polish composition comprising such a derivative is specifically disclosed. It is an object of the present invention to improve the appearance of a floor polish composition, which composition may already include a conventional optical brightener.

A compound which offers dual functionality in a floor polish composition can be very desirable to the polish formulator: such compounds can be used advantageously in floor polish compositions either to supplement one or more other components to obtain higher performance polishes or to substitute, in whole or in part, one or more other components in a polish composition without loss of performance. Accordingly, it is a further object of the present invention to identify a compound which can offer not only improved appearance in a floor polish composition but also some other property pertinent to a polish composition.

Floor polish compositions based on aqueous dispersions of water insoluble emulsion polymers containing acid functional residues and polyvalent metal ion or complex crosslinking agents are well known in the prior art. Such compositions are disclosed in, for example, U.S. Pat. No. 3,328,325, U.S. Pat. No. 3,467,610, U.S. Pat. No. 3,554,790, U.S. Pat. No. 3,573,239, U.S. Pat. No. 3,808,036, U.S. Pat. 4,150,005, U.S. Pat. No. 4,517,330, U.S. Pat. No. 5,149,745 and U.S. Pat. No. 5,319,018. Though it is known that all the transition metals are capable of forming polymeric crosslinks, there has been a tendency over the years to avoid use of certain transition metals due to their production of colour in the crosslinked polish film and, instead, use a metal which produces low colour in the crosslinked polish film, such as zinc. Copper dimethylaminoacetate is disclosed in Example 11 of U.S. Pat. No. 3,554,790 as a crosslinker in a floor polish film in an amount equivalent to 108,640 ppm $Cu^{++}$ on polymer solids.

In accordance with the present invention, there is provided a process of improving the appearance of a floor polish composition, the process comprising:

a) charging a reaction zone with an aqueous suspension or dispersion of a water insoluble polymer, said polymer being prepared from more than one ethylenically unsaturated monomer and containing acid functional residues, and from 10 to 100% of the stoichiometric amount based on said polymer acid functionality of at least one polyvalent metal crosslinking agent, and b) reacting said polymer and said crosslinking agent to form a crosslinked polymeric product, wherein said at least one polyvalent metal ion or complex crosslinking agent comprises a divalent copper ion in an amount of from 50 to less than 5000 ppm based on polymer solids.

In accordance with another aspect of the present invention, there is provided a floor polish vehicle composition which yields floor polishes with improved appearance comprising an aqueous suspension or dispersion of a water insoluble polymer, said polymer being prepared from more than one ethylenically unsaturated monomer and containing acid functional residues, and from 10 to 100% of the stoichiometric amount based on said polymer acid functionality of at least one polyvalent metal crosslinking agent, wherein said at least one polyvalent metal ion or complex crosslinking agent comprises a divalent copper ion in an amount of from 50 to less than 5000 ppm based on polymer solids.

In a further aspect, the present invention provides the use in an amount of from 50 to less than 5000 ppm based on polymer solids in a floor polish vehicle composition, comprising an aqueous suspension or dispersion of a water insoluble polymer, said polymer being prepared from more than one ethylenically unsaturated monomer and containing acid functional residues, and from 10 to 100% of the stoichiometric amount based on said polymer acid functionality of at least one polyvalent metal crosslinking agent, to improve the appearance of a floor polish comprising said floor polish vehicle composition.

It has been found that floor polish compositions comprising a divalent copper ion crosslinking agent in the amount prescribed have an improved appearance over similar polish compositions but which comprise no such copper ions. It has also been found that the appearance of a polish composition which already comprises an optical brightener can be improved through the use of a divalent copper ion crosslinking agent, even when the divalent copper ion is present in very low quantities. This finding is particularly surprising since hitherto divalent copper crosslinkers have only been incorporated into floor polish compositions in such relatively high quantities (over 5000 ppm in U.S. Pat. No. 3,554,790) that they detract from the aesthetic appearance of the dried polish film.

Preferably the quantity of divalent copper ions used is from 100 to 3500 ppm, more preferably from 200 to 2000 ppm, and most preferably from 250 to 1500 ppm, based on polymer solids.

Provided that the amount of divalent copper ion used is within the range 50 to less than 5000 ppm based on polymer solids, the other parameters of the process are readily derived from known process for the preparation of floor polish compositions. For example, such processes are disclosed in U.S. Pat. No. 3,308,078, U.S. Pat. No. 3,328,325, U.S. Pat. No. 3,467,610, U.S. Pat. No. 3,554,790, U.S. Pat. No. 3,573,329, U.S. Pat. No. 3,711,436, U.S. Pat. No. 3,808,036, U.S. Pat. No. 4,150,005, U.S. Pat. No. 4,517,330, U.S. Pat. No. 5,149,745, and U.S. Pat No. 5,319,018.

Preferably, the water insoluble copolymer has a Tg of at least 10° C., more preferably at least 40° C. (calculated using the Fox Equation: $1/T_g = W_A/T_{g_A} + W_B/T_{g_B}$ where $T_g$ is the glass transition temperature (° K), $T_{g_A}$ and $T_{g_B}$ are the glass transition temperatures of the homopolymers A and B, and $W_A$ and $W_B$ represent the weight fractions of the components A and B of the copolymer, respectively (T. G. Fox, Bull. Am. Phys. Soc. 1, 123 (1956)).

Preferably the crosslinked polymeric product formed by the reaction of the water insoluble polymer and crosslinking agent has a minimum film forming temperature above the Tg of the water insoluble copolymer.

The water insoluble polymer is preferably formed from a monomer mix comprising 0% or up to 70%, preferably 25% to 50%, by weight of at least one vinyl aromatic monomer; 3% to 50%, preferably 5% to 25%, by weight of at least one acidic monomer; and no more than 97%, preferably 30% to 97% and more preferably 30% to 70%, by weight of at least one monomer selected from the ($C_1$–$C_{20}$) alkyl (meth) acrylates, preferably the ($C_1$–$C_{12}$)

Preferably, the vinyl aromatic monomer(s) is/are alpha, beta ethylenically unsaturated aromatic monomers and is/are preferably selected from the group consisting of styrene (Sty), vinyl toluene, 2-bromo styrene, o-bromo styrene, p-chloro styrene, o-methoxy styrene, p-methoxy styrene, allyl phenyl ether, allyl tolyl ether and alpha-methyl styrene. Sty is the most preferred monomer.

Preferably, the acidic monomer(s) is/are alpha, beta monoethylenically unsaturated acids and is/are preferably selected from the group consisting of maleic acid, fumaric acid aconitic acid, crotonic acid, citraconic acid, acryloxypropionic acid, acrylic acid, methacrylic acid (MAA) and itaconic acid. MAA is the most preferred. Other acidic monoethylenically unsaturated monomers that may be copolymerized to form the water insoluble, film forming polymers are partial esters of unsaturated aliphatic dicarboxylic acids and the alkyl half esters of such acids. For example, the alkyl half esters of itaconic acid, fumaric acid and maleic acid wherein the alkyl group contains 1 to 6 carbon atoms such as methyl acid itaconate, butyl acid itaconate, ethyl acid fumarate, butyl acid fumarate and methyl acid maleate.

The monomer mix comprises no more than 97% by weight of at least one monomer selected from methyl methacrylate (MMA), methyl acrylate, ethyl acrylate, ethyl methacrylate, n-butyl acrylate (BA), butyl methacrylate (BMA), iso-butyl methacrylate (IBMA), 2-ethyl hexyl acrylate, n-octyl acrylate, sec-butyl acrylate, and cyclopropyl methacrylate.

The monomer mix may also comprise 0% or up to 40% by weight of at least one polar or polarizable nonionogenic hydrophilic monomer, such as acrylonitrile, methacrylonitrile, cis- and trans- crotononitrile, alphacyanostyrene, alpha-chloroacrylonitrile, ethyl vinyl ether, isopropyl vinyl ether, isobutyl- and butyl-vinyl ether, diethylene glycol vinyl ether, decyl vinyl ether, vinyl acetate, isobornyl methacrylate, hydroxyalkyl (meth) acrylates such as 2-hydroxy ethyl methacrylate, 2-hydroxyethyl acrylate, 3-hydroxy propyl methacrylate, butanediol acrylate, 3-chloro-2-hydroxypropyl acrylate, 2-hydroxypropyl acrylate, 2-hydroxypropyl methacrylate, and vinyl thiols such as 2-mercaptopropyl methacrylate, 2-sulphoethyl methacrylate, methyl vinyl thiol ether and propyl vinyl thio ether.

The monomer mix may also comprise 0% or up to 10% by weight of at least one monomeric vinyl ester in which the acid moiety of the ester is selected from the aromatic and ($C_1$ to $C_{18}$) aliphatic acids. Such acids include formic, acetic, propionic, n-butyric, n-valeric, palmitic, stearic, phenyl acetic, benzoic, chloroacetic, dichloroacetic, gamma-chloro butyric, 4-chlorobenzoic, 2,5-dimethyl benzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids. The hydroxy vinyl moiety of the monomer may for example be selected from hydroxy vinyl compounds such as hydroxy ethylene, 3-hydroxy-pent-1-ene, 3,4-dihydroxybut-1-ene, and 3-hydroxy-pent-1-ene, it being understood that such derivation can be purely formal such as in the case of the vinyl acetate monomer in which the compound may be considered to be derived from acetic acid and hydroxy ethylene, although the monomer cannot in fact be prepared from such a precursor compound.

The process for the preparation of the aqueous dispersible water insoluble polymers of this invention is well known in the art. The practice of emulsion polymerization is discussed in detail in D. C. Blackley, Emulsion Polymerization (Wiley, 1975). The latex polymers of this invention may also be formulated using internally plasticized polymer emulsions. Preparation of internally plasticized polymer emulsions is described in detail in U.S. Pat. No. 4,150,005 and the preparation of non-internally plasticized floor polish emulsion polymers is described in U.S. Pat. No. 3,573,239, U.S. Pat. No. 3,328,325, U.S. Pat. No. 3,554,790 and U.S. Pat. No. 3,467,610.

Conventional emulsion polymerization techniques as described above may be used to prepare the polymer latices of this invention. Thus the monomers may be emulsified with anionic or nonionic dispersing agents; about 0.5% to 10% thereof on the weight of total monomers preferably being used. Acidic monomers are water soluble and thus serve as dispersing agents which aid in emulsifying the other monomers used. A polymerization initiator of the free radical type, such as ammonium or potassium persulphate, may be used alone or in conjunction with an accelerator, such as potassium metabisulphate or sodium thiosulphate. The initiator and accelerator, commonly referred to as catalysts, may conveniently be used in proportions of 0.5% to 2% each based on the weight of monomers to be copolymerized. The polymerization temperature may for example be from room temperature to 90° C., or more, as is conventional.

Examples of emulsifiers which are suited to the polymerization process of emulsions useful in this invention include alkaline metal and ammonium salts of alkyl, aryl, alkaryl and aralkyl sulphonates, sulphates and polyether sulphates, such as sodium vinyl sulphonate, and sodium methallyl sulphonate; the corresponding phosphates and phosphonates, such as phosphoethyl methacrylate; and alkoxylated fatty acids, esters, alcohols, amines, amides and alkylphenols.

Chain transfer agents, including mercaptans, polymercaptans and polyhalogen compounds are often desirable in the polymerization mixture to control polymer molecular weight.

The floor polish composition preferably comprises the water insoluble polymer as defined in any embodiment above, from 10 to 100% of the equivalents of the acid residues in the polymer of at least one polyvalent metal ion or complex crosslinking agent, including 50 to 5000 ppm divalent copper ion, and optionally at least one basic hydroxide or salt of an alkali metal, as taught in U.S. Pat. No. 4,517,330. The polyvalent metal may be divalent copper alone or a mixture of divalent copper and another polyvalent metal, preferably a transition metal, such as zinc. A floor polish composition wherein the total transition metal ion or complex crosslinking agent content is from 25% to 80% of the equivalent of the acid residues in the polymer and/or the molar ratio of total transition metal content is from 1.0:0.25 to 1.0:2.0 is preferred. Still more preferred is a composition wherein the total transition metal content is from 30% to 70% of the equivalent of the acid residues in the polymer and/or the molar ratio of total transition to alkali metal is from 1.0:0.5 to 1.0:1.5.

The polyvalent and alkali metal ion and complex crosslinking agents useful in the present invention are well known in the art. These are described in for example, U.S. Pat. No. 3,328,325, U.S. Pat. No. 3,328,325, U.S. Pat. No.

3,467,610, U.S. Pat. No. 3,554,790, U.S. Pat. No. 3,573,329, U.S. Pat. No. 3,711,436, U.S. Pat. No. 3,808,036, U.S. Pat. No. 4,150,005, U.S. Pat. No. 4,517,330, U.S. Pat. No. 5,149,745, U.S. Pat. 5,319,018, U.S. Pat. No. 5,149,745 and U.S. Pat. No. 5,319,018. The preferred polyvalent metal complexes include the diammonium zinc (II) and tetraammonium zinc (II) ions, cadmium glycinate, nickel glycinate, zinc glycinate, zirconium glycinate, zinc alanate, copper beta-alanate, zinc beta-alanate, zinc valanate, copper bis-dimethylamino acetate.

The polyvalent and alkali metal ion and complex crosslinking compounds are readily soluble in the aqueous medium of the polish composition, especially at a pH in the range 6.5 to 10.5. However, the polish composition containing these compounds dries to form a polish deposit which is essentially insoluble in water but still removable. The polyvalent metal complex may also be added as a solution to the water insoluble film forming polymer latex. This may be accomplished by solubilizing the metal complex in an alkaline solution such as dilute ammonia. Since the ammonia may complex with the polyvalent metal compound, a compound such as cadmium glycinate, when solubilized in an aqueous ammonia solution may be named cadmium ammonia glycinate. Other polyvalent metal complexes described may be similarly named.

Although, to be suitable, the polyvalent metal complex must be stable in an alkaline solution, a complex that is too stable is undesirable because dissociation of the metal ion would then be retarded during the film formation of the polish coating.

The floor polish composition should preferably have a minimum film forming temperature (MFT) of less than 100° C. and more preferably less than 80° C.

The polyvalent metal ion and complex crosslinking agent may be incorporated into the polish composition at any stage of its formulation.

Similarly, the basic salt of the alkaline metal may be incorporated with the polyvalent metal ion and complex crosslinking agent at any stage of the polish formulation.

In general, the floor polish compositions of the present invention will comprise the following main components:
- a) 10–100 parts by solids weight water insoluble polymer which has been previously or subsequently crosslinked with a polyvalent metal complex and/or alkali metal basic salt;
- b) 0–90 parts by solids weight wax emulsion;
- c) 0–90 parts by solids weight alkali soluble resin (ASR)
- d) 0.01–20 parts by weight of polymer solids wetting, emulsifying and dispersing agents, defoamer, leveling agent; optical brighteners, plasticizers and coalescing solvents, sufficient for polish film formation at application temperature;
- e) water, sufficient to make total polish solids 0.5% to 45%, preferably 5% to 30%.

The total of a), b) and c) should be 100.

The amount of c), when present may be up to 100% of a) and is preferably from 3% to 25% of the weight of a). Satisfactory floor polish formulations have been prepared without the inclusion of an ASR. Thus, an ASR is not an essential component of a durable floor polish composition. Depending on the properties inherent to the polish vehicle composition and other formulation ingredients (d), the ASR may optionally be employed to moderately reduce total formulation costs, improve leveling and gloss properties, and increase the polish sensitivity to alkaline strippers, depending upon the ultimate balance of properties desired by the polish formulator and qualities of ASR.

For a high speed burnish polish compositions, the wax level should preferably be more than 6% by weight of the total solids of a), b) and c).

In addition to the divalent copper ions, the polish composition may contain other crosslinking agents and optical brighteners, which may be used in conventional amounts or less, depending upon the balance of properties desired by the formulator.

Conventional wetting agents, dispersing agents, defoamers, plasticizers and coalescing solvents may be used in conventional amounts, depending upon the balance of performance properties desired by the formulator. Other formulation ingredients, such as perfumes or odor-masking agents, dyes or colorants, bacteriocides and bacteriostats, may also be optionally included by the formulator.

The invention will now be more specifically described in terms of the following examples of some preferred embodiments which are given for the purposes of illustration only, and may be contrasted with the comparative tests also given below.

Floor Tests for Appearance Performance

The floor test areas were stripped of residual polish and repolished in the typical janitorial procedure as follows:

The floors were dust mopped to remove loose dirt. A 1:1 aqueous solution of commercial stripper solution ("SSS Easy Strip" Standardized Sanitation Systems, Inc., Burlington, Mass. 01803) was applied by string mop at a rate of ca. 1,000 square feet/gallon (25 $m^2 l^{-1}$) after a five minute soak period, the floors were scrubbed with a sixteen inch (40 cm) diameter black stripping floor pad (3M Company, St. Paul, Minn. 55101; "Scotch Brite" Slim Line Floor Pad) on a 175 rpm floor machine (Howell Electric Motors, Plainfield, N.J., model 88400-026); the stripped floors were thoroughly rinsed twice by damp mopping with clear water, and allowed to dry. The stripped floors were divided into 20 square foot (2 $m^2$) sections perpendicular to the normal direction of floor traffic flow. To each of the sections four coats of polish to be tested were applied, with a SSS Finish Wide Band, Small cotton/rayon string mop No. 37627, at a rate of ca. 2,000 square feet/gallon (50 $m^2 l^{-1}$). Each coat was allowed to dry for one hour before the next coat was applied.

Coatings were applied to floors composed of white vinyl composition tiles, and cured at ambient conditions. After the coatings had dried they were exposed to pedestrian traffic for one month with no maintenance. They were examined visually to determine the appearance of the coatings. The appearance of the coating was determined by appraising the general appearance of film compared to a comparative polish. This test was designed to distinguish relative differences. Appearance is a property that is difficult to measure quantitatively. Therefore, "perceptions of cleanliness" or "cleaner-looking are the real criteria of appearance and visual observation, as with other qualitative measurements used in the evaluation of floor coatings, is fully acceptable to those skilled in the art.

Appearance was rated on the following scale:
- 5—much better than the comparative
- 4—better than the comparative
- 3—equivalent to the comparative
- 2—worse than the comparative
- 1—much worse than the comparative Black Heel Mark and Scuff Resistance—The method for determining black heel and scuff resistance described in Chemical Specialty Manufacturers Association Bulletin No. 9-73 was utilized, except that commercially available rubber shoe heels were used in place of the recommended 2" (5.08 cm) rubber cubes. Furthermore, instead of subjectively rating the coated substrate, the percentage of the coated substrate area covered by black heel and scuff marks was determined; this is conveniently performed with transparent graph paper. A black heel mark is an actual deposition of rubber onto or into the coating, whereas a scuff mark results from physical displacement of the coating which appears as an area of reduced gloss. Scuff and black heel marks can occur independently or simultaneously at the point where the heel impacts the substrate; i.e., upon removal of a black heel mark, a scuff may be present.

Gloss—The method for determining the gloss performance of polish compositions is described in "Annual Book of ASTM Standards, Section 15, Volume 15.04, Test Procedure ASTM D 1455. A Gardner Byk Micro-Tri-Gloss meter, catalog number 4520, was used to record 60° and 20° gloss.

Recoatability—The method for determining the recoatability of water-based emulsion floor polishes is described in "Annual Book of ASTM Standards," Section 15, Volume 15.04, Test Procedure ASTM D 3153.

Water Resistance—The method for determining the water resistance of polish compositions is described in "Annual Book of ASTM Standards," Section 15, Volume 15.04, Test Procedure ASTM D 1793, and the following scale was used to rate the water resistance of the coating compositions:

Excellent—No water mark or perceptible damage to coating

Very Good—Faint water outline

Good—Slight degree of film whitening

Fair—Film whitening with some blisters and lifting

Poor—Complete film failure with gross whitening and loss of adhesion

Detergent Resistance—The method for determining detergent resistance is described in "Annual Book of ASTM Standards," Section 15, Volume 15.04, Test Procedure ASTM D 3207, except that a 1/20 dilution of Forward® (S. C. Johnson and Sons, Inc.; Racine, Wis.) in water was used as test detergent solution.

Removability—The method for determining polish removability is described in "Annual Book of ASTM Standards," Section 15, Volume 15.04, Test Procedure ASTM D 1792, except that a 1/20 dilution of Forward® (S. C. Johnson and Sons, Inc.; Racine, Wis.) in water with 1% NH3 was used as the stripping solution.

Film Formation—A draw-down using 0.4 mL of the coating composition was applied by means of a 2 inch (5.08 cm) wide blade applicator (as specified in ASTM D 1436), having a clearance of 0.008 inches (0.02 cm), to a length of 4 inches (10.16 cm) on a vinyl composition tile. Immediately after application of the polish, the tile was placed on a level surface in a refrigerator at 10° C. The dried film was rated as follows:

Excellent—No crazing

Very Good—Slight edge crazing

Good—Definite edge crazing

Fair—Definite edge crazing with very slight center crazing

Poor—Complete edge and center crazing

EXAMPLES

The following examples are presented to illustrate the invention. They are not intended to limit the invention.

Formulation of Coatings Based on Copper Modified Emulsions

In order to properly evaluate the performance of an emulsion polymer intended for use in a polish vehicle, it is necessary that the polymer be formulated as a polish. The formulation of the emulsion polymers of this invention is done in the manner common to floor polish formulating practices. The ingredients used, and their proportions and manner of addition are the same as is commonly practiced with conventional technology emulsion polymers.

1A Aqueous Floor Polish Formulation for Examples 1–4 (Order of addition shown)

| Material | Function | Amount (parts by weight) |
|---|---|---|
| Water | diluent | 43.2 |
| FC-120(1%)[1] | wetting agent | 1.00 |
| Kathon CG/ICP(1.5%)[2] | biocide | 0.03 |
| SE-21[3] | defoamer | 0.02 |
| Diethylene Glycol Ethyl Ether | coalescent | 2.63 |
| Dipropylene Glycol Methyl Ether | coalescent | 3.68 |
| Dibutyl Phthalate | plasticizer | 1.10 |
| Tributoxy Ethyl Phosphate | leveling aid | 1.58 |
| Emulsion (38%) | vehicle | 40.31 |
| ASR-Plus (35%)[2] | alkali soluble/swellable resin | 2.35 |
| AC-540N(30%)[4] | polyethylene wax emulsion | 4.10 |

Formulation Constants:
Polymer/ASR/Wax Ratio 88/7/5
Theoretical Non-Volatile Solids 20%
[1]3M Co. (Minneapolis, MN)
[2]Rohm and Haas Co. (Philadelphia, PA)
[3]Wacker Silicones Corp. (Adrian, MI)
[4]Allied-Signal Corp. (Morristown, NJ)

1B Aqueous Floor Polish Formulation for Examples 5–6 (Order of addition shown)

| Material | Function | Amount (parts by weight) |
|---|---|---|
| Water | diluent | 44.61 |
| FC-120(1%)[1] | wetting agent | 0.45 |
| Kathon CG/ICP (1.5%)[2] | biocide | 0.03 |
| SE-21[3] | defoamer | 0.02 |
| Diethylene Glycol Ethyl Ether | coalescent | 2.64 |
| Dipropylene Glycol Methyl Ether | coalescent | 1.64 |
| Tributoxy Ethyl Phosphate | leveling aid | 0.73 |
| Dibutyl Phthalate | plasticizer | 0.73 |
| Emulsion (38%) | vehicle | 36.57 |
| ASR-Plus (35%)[2] | alkali soluble/swellable resin | 2.65 |
| E-43N (40%)[4] | polypropylene wax emulsion | 4.64 |
| AC-325N (35%)[5] | polyethylene wax emulsion | 5.29 |

Formulation Constants:
Polymer/ASR/Wax Ratio 75/5/20
Theoretical Non-Volatile Solids 20%
[1]3M Co. (Minneapoiis, MN)
[2]Rohm and Haas Co. (Philadelphia, PA)
[3]Wacker Silicones Corp. (Adrian, MI)
[4]Eastman Chemical Corp. (Eastport, TN)
[5]Allied-Signal Corp. (Morristown, NJ)

Examples 1–4 demonstrate the improvement in appearance properties of the invention using a conventional aqueous based polymer prepared according to the technology taught in U.S. Pat. No. 4,517,330.

Example 1

A polymer latex was prepared with a monomer composition of 35BA/9MMA/40ST/16MAA. The latex composition further contains 3.6% $Zn^{++}$ on latex solids, added as $Zn(NH_3)_4(HCO)_3)_2$ and 0.7% $K^+$ on latex solids, added as KOH. Example 1 is a comparative containing no copper. Example 1 was formulated into the test composition as described in formulation 1A.

Examples 2–4

The coating composition of Example 2 contains 500 ppm Cu (II), added as $Cu(OH)_2$, but otherwise has the same composition as described in Example 1. Example 2 was formulated into the test composition as described in formulation 1A.

The coating composition of Example 3 contains 1000 ppm Cu (II), added as $Cu(OH)_2$, but otherwise has the same composition as described in Example 1. Example 3 was formulated into the test composition as described in formulation 1A.

The coating composition of Example 4 contains 5000 ppm Cu (II), added as $Cu(OH)_2$, but otherwise has the same composition as described in Example 1. Example 4 was formulated into the test composition as described in formulation 1A.

The compositions of Examples 1–4 were tested for appearance and other floor polish performance properties. The results, listed in Table 1, show that the coating composition having copper improves the appearance characteristic of a coating without affecting the key floor polish performance properties.

TABLE 1

|  | Example 1 (comparative) no copper | Example 2 500 ppm copper | Example 3 1000 ppm copper | Example 4 5000 ppm copper |
| --- | --- | --- | --- | --- |
| Appearance | 3 | 4 | 4 | 2 |
| Black Heel Mark Resistance (% Coverage) | 4.1 | 4.0 | 4.0 | 4.3 |
| Scuff Mark Resistance (% Coverage) | 2.5 | 2.5 | 2.5 | 2.5 |
| Gloss 60°, 20° | 75°, 25° | 77°, 22° | 75°, 22° | 70°, 20° |
| Recoatability | Good | Good | Good | Good |
| Water Resistance | Very Good-Excellent | Very Good-Excellent | Very Good-Excellent | Very Good-Excellent |
| Detergent Resistance | Excellent | Excellent | Excellent | Excellent |
| Removability | Excellent | Excellent | Excellent | Excellent |
| Film Formation | Excellent | Excellent | Excellent | Excellent |

Examples 5–6 demonstrate the improvement in appearance properties of the invention using a conventional aqueous based polymer formulated into a coating composition.

Example 5

A polymer latex was prepared according to the technology taught in U.S. Pat. No. 4,150,005 by Gehman, et. al. having a monomer composition of 30 BA/10.5MMA/5HEMA/4.5MAA//40STY/5MMA/5AA. The latex composition further contains 3.2% $Zn^{++}$ on latex solids, added as $Zn(NH_3)_4(HCO_3)_2$. Example 5 is a comparative containing no copper. Example 5 was formulated into the test composition as described in Formulation 1B.

Example 6

The coating composition of Example 6 contains 1000 ppm Cu (II) added as $Cu(OH)_2$, but otherwise has the same composition as described in Example 5. Example 6 was formulated into the test composition as described in Example 5.

The compositions of Examples 5–6 were tested for appearance and floor polish performance properties. The results, listed in Table 2, show that the coating composition having copper improves the cleanliness characteristic of a coating without affecting the key floor polish performance properties.

TABLE 2

|  | Example 5 (comparative) | Example 6 |
| --- | --- | --- |
|  | no copper | 1000 ppm copper |
| Leveling | 3 | 4 |
| Black Heel Mark Resistance (% Coverage) | 2.6 | 2.5 |
| Scuff Mark Resistance (% Coverage) | 4.0 | 4.3 |
| Gloss 60°, 20° | 83°, 30° | 85°, 33° |
| Recoatability | Good | Good |
| Water Resistance | Very Good - Excellent | Very Good - Excellent |
| Detergent Resistance | Excellent | Excellent |
| Removability | Excellent | Excellent |
| Film Formation | Excellent | Excellent |

We claim:

1. A process of improving the appearance of a floor polish composition, the process comprising:

a) charging a reaction zone with an aqueous suspension or dispersion of a water insoluble polymer, said polymer being prepared from more than one ethylenically unsaturated monomer and containing acid functional residues, and from 10 to 100% of the stoichiometric amount based on said polymer acid functionality of at least one polyvalent metal crosslinking agent, and b) reacting said polymer and said crosslinking agent to form a crosslinked polymeric product, wherein said at least one polyvalent metal ion or complex crosslinking agent comprises a divalent copper ion in an amount of from 50 to less than 5000 ppm based on polymer solids.

2. A process as claim in claim 1, wherein the quantity of divalent copper ions used is from 100 to 3500 ppm based on polymer solids.

3. A floor polish vehicle composition which yields floor polishes with improved appearance comprising an aqueous suspension or dispersion of a water insoluble polymer, said polymer being prepared from more than one ethylenically unsaturated monomer and containing acid functional residues, and from 10 to 100% of the stoichiometric amount based on said polymer acid functionality of at least one polyvalent metal crosslinking agent, wherein said at least one polyvalent metal ion or complex crosslinking agent comprises a divalent copper ion in an amount of from 50 to less than 5000 ppm based on polymer solids.

* * * * *